United States Patent

Miyazaki et al.

[11] Patent Number: 5,294,866
[45] Date of Patent: Mar. 15, 1994

[54] RASTER DISTORTION CORRECTING SIGNAL SYNTHESIZER

[75] Inventors: Shinichirou Miyazaki; Kyoichi Murakami, both of Kanagawa, Japan

[73] Assignee: Sony Corporation, Tokyo, Japan

[21] Appl. No.: 848,227

[22] Filed: Mar. 9, 1992

[30] Foreign Application Priority Data

Mar. 12, 1991 [JP] Japan .................. 3-046856

[51] Int. Cl.$^5$ .................. G09G 1/04; H01J 29/70
[52] U.S. Cl. ................... 315/367; 315/371
[58] Field of Search .......... 315/367, 370, 371, 368.12, 315/368.18

[56] References Cited

U.S. PATENT DOCUMENTS

| | | | |
|---|---|---|---|
| 3,501,669 | 3/1970 | Henderson | 315/371 |
| 4,689,526 | 8/1987 | Schweer | 315/371 |
| 5,013,978 | 5/1991 | Macauley | 315/367 |

Primary Examiner—Gregory C. Issing
Attorney, Agent, or Firm—Lewis H. Eslinger; Jay H. Maioli

[57] ABSTRACT

A raster distortion correcting signal synthesizer includes a multiplier, an adder, a memory for storing data and a coefficient, and a controller for controlling the multiplier, adder and memory in accordance with a count value of a horizontal sync. signal. The controller calculates a desired raster distortion correcting signal of a high order by utilizing the multiplier and adder on the basis of the count value, and multiplies the count value by a predetermined coefficient to obtain a new count value.

3 Claims, 4 Drawing Sheets

Picture Screen

RASTER DISTORTION CORRECTING SIGNAL SYNTHESIZER

BACKGROUND OF THE INVENTION

1. Field of the Invention

The present invention generally relates to synthesizers and, more particularly, is directed to a raster distortion correcting signal synthesizer suitable for use in a monitor receiver or the like.

2. Description of the Prior Art

As a raster distortion correcting signal synthesizer used in a monitor receiver or the like, there has been proposed an apparatus which generates a correcting signal for correcting the raster distortion such as a sawtooth wave signal or a parabolic wave signal or the like in accordance with a count value of a horizontal synchronizing (sync.) signal. However, the proposed conventional synthesizer or apparatus is constituted by analog circuits, so-called hard logic, and digital adder-subtracters.

The demand for accuracy of an image with respect to the distortion has been increasing according to the tendency of flattening and enlarging a cathode ray tube (CRT), so that a high-order raster distortion correcting signal has been required. However, when the high-order raster distortion correcting signal is generated by the conventional synthesizer employing the analog circuits and digital adder-subtracters, it has been difficult to obtain sufficient accuracy of the image.

Further, in case of producing a multistandardized television receiver having the conventional synthesizer employing the analog circuits and digital adder-subtracters, it is required to arrange the circuit configurations for every system or receiver. In this case, it is further required to store parameters required for the adjustments for every system, so that a memory or the like for storing the parameters is required, resulting in the circuit configurations being enlarged.

OBJECTS AND SUMMARY OF THE INVENTION

It is an object of the present invention to provide an improved raster distortion correction signal synthesizer in which the aforementioned shortcomings and disadvantages encountered with the prior art can be eliminated.

More specifically, it is an object of the present invention to provide a raster distortion correction signal synthesizer which can be multistandardized or can obtain high-order raster distortion correction signal according to the tendency of flattening and enlarging a CRT without enlarging the circuit configurations.

As an aspect of the present invention, a raster distortion correcting signal synthesizer is comprised of a multiplier, an adder, a memory for storing data and a coefficient, and a controller for controlling the multiplier, adder and memory in accordance with a count value of a horizontal sync. signal, wherein the controller calculates a desired raster distortion correcting signal of a high order by utilizing the multiplier and adder on the basis of the count value, and multiplies the count value by a predetermined coefficient to obtain new count value.

According to the thus constructed raster distortion correcting signal synthesizer of the present invention, the synthesizer can be multistandardized by merely multiplying the count value by a predetermined coefficient, thereby making it possible to obtain various kinds of desirable correction waves depending on the respective systems by the simplified circuit configurations.

The preceding and other objects, features, and advantages of the present invention will become apparent from the following detailed description of an illustrative embodiment thereof when read in conjunction with the accompanying drawings.

DESCRIPTION OF THE PREFERRED EMBODIMENT

An embodiment of a raster distortion correction signal synthesizer according to the present invention will be described with reference to FIGS. 1 to 5.

Figure 1:
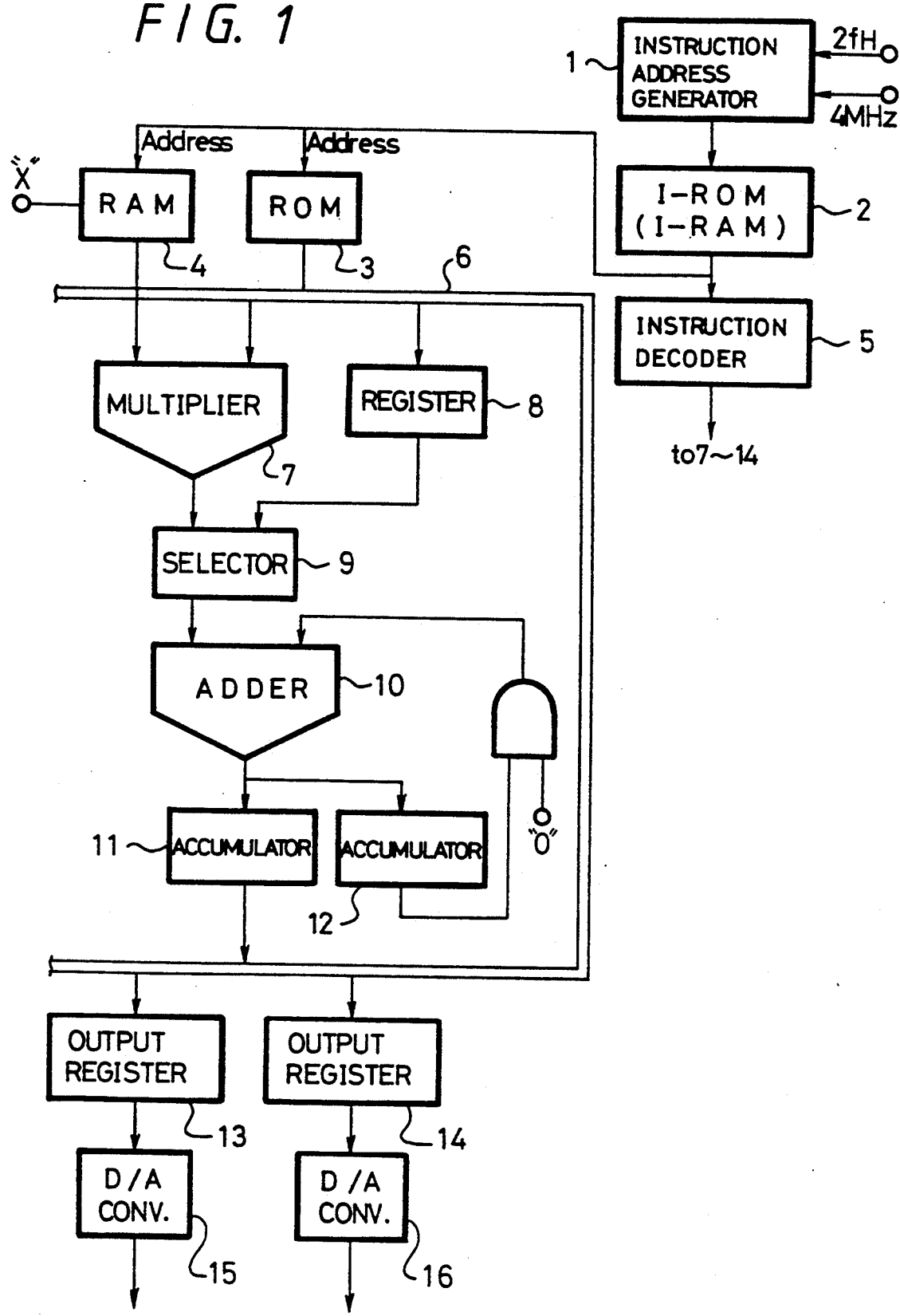
FIG. 1 shows in block form an arrangement of a main part of an embodiment of a raster distortion correction signal synthesizer according to the present invention.

FIG. 1 shows a block diagram of an arrangement of a main part of the embodiment of the raster distortion correction signal synthesizer according to the present invention.

Referring to FIG. 1, an instruction address generator 1 is supplied with a timing signal whose frequency ($2f_H$) is, for example, twice that ($f_H$) of a horizontal sync. signal and a clock signal with a frequency of 4 MHz. A value generated by the instruction address generator 1 is supplied to an instruction read only memory (I-ROM) and instruction random access memory (I-RAM) 2 which in turn supplies its output to an instruction decoder 5 and an address input of each of a ROM 3 for storing data and a RAM 4.

An output of the ROM 3 is supplied to a multiplier 7 and a register 8 through a bus line 6. An output of the RAM 4 is also supplied to the multiplier 7. Outputs of the multiplier 7 and the register 8 are selectively supplied to one input of an adder 10 through a selector 9. An output of the adder 10 is then supplied to first and second accumulators (ACCs) 11 and 12. An output of the accumulator 12 is supplied to the other input of the adder 10 through an AND gate, while an output of the accumulator 11 is supplied to the multiplier 7, register 8 and RAM 4 through the bus line 6. The output of the accumulator 11 is also supplied to first and second output registers 13 and 14 through the bus line 6.

Operation of each of the multiplier 7, register 8, selector 9, adder 10, accumulators 11, 12 and output registers 13, 14 is controlled in accordance with an output signal from the instruction decoder 5.

When a count value X obtained by counting the timing signal of the frequency $2f_H$, for example, is supplied to the thus constructed synthesizer, the synthesizer can deliver correction wave signals of desired high-order formulas, e.g., a sawtooth wave signal $[Y_{SAW}=(CX^3+DX^2+X)B+A]$ and a parabolic wave signal $[Y_{PARA}=(GX^4+X^2+HX)FB^2+E]$. In these formulas, A, B, C, D, E, F, G and H represent parameters of vertical shift, vertical size, S correction, linearity, horizontal size, pin amplification, pin phase, and corner pin, respectively. The correction wave signals are delivered in a manner that, at every horizontal sync. signal, values ($Y_{SAW}$, $Y_{PARA}$) of the sawtooth and parabolic wave signals at the time point are delivered to the output registers 13 and 14, and then output signals of which are supplied to an output amplifier of a horizontal deflection circuit (not shown) through digital-to-analog (D/A) converters 15 and 16, respectively.

Values of the above-described correction wave signals can be calculated in the following manner, for example. Table 1 shows an example of program lists for performing the calculation of the sawtooth wave signal $[Y_{SAW}=(CX^3+DX^2+X)B+A]$ by the circuit arrangement of FIG. 1.

TABLE 1

| a | b | c | d | e | f | g | h |
|---|---|---|---|---|---|---|---|
| 79 | L | K > Y | Z + L = . | — | R | 0D | M |
| 7a | L | K > Y | Z + R = . | — | R | 14 | M |
| 7b | M | — > — | Z + R = H | B | — | 12 | M |
| 7c | M | — > — | A + B = . | A | — | 12 | M |
| 7d | L | K > Y | A + L = . | — | R | 16 | O |
| 7e | M | — > — | Z + R = H | A | — | 0D | L |
| 7f | M | — > — | A + B = H | B | — | 0D | M |
| 80 | M | — > — | A + B = . | A | — | 0D | M |
| 81 | L | K > Y | A + L = . | — | R | 00 | O |
| 82 | M | — > — | Z + R = H | A | — | 0D | L |
| 83 | M | — > — | Z + B = H | B | — | 0D | M |
| 84 | M | — > — | A + B = . | A | — | 0D | M |
| 85 | L | K > Y | A + L = . | — | R | 11 | M |
| 86 | M | — > — | Z + S = H | A | — | 10 | L |
| 87 | M | — > — | A + B = H | B | — | 10 | M |
| 88 | M | — > — | A + B = . | A | — | 10 | M |
| 89 | L | K > Y | A + L = . | — | R | 00 | O |
| 8a | L | X > Y | Z + L = . | A | 1 | 00 | M |

The calculation of the sawtooth wave signal is performed by using this table 1 as follows $$Y_{SAW}=(((CX+D)X+1)X+0)B+A$$

This calculation is performed with accuracy of 16 bits in view of a fact that the ability of the multiplier 7 is 8×8 bits.

In the table 1, a column a represents addresses of the instruction ROM and RAM 2, and the calculation is executed in accordance with the order of the addresses. A column b represents kinds of instructions, wherein M, L and J represent multiplication, load and jump instructions, respectively. The jump instruction is not represented in table 1. A column c represents kinds of load instructions, wherein K>Y represents load of data between the memory and the register and X>Y represents load of data between the registers. A column d represents calculation formulas performed by the adder 10. A column e represents a kind and a content of the register X of the column c when the column b represents the load instruction, while represents a kind and a content of a register of the column c to be multiplied when the column b represents the multiplication instruction, wherein A represents upper 8 bits of the accumulators 11, 12 and B lower 8 bits thereof. A column f represents a kind of the register Y, wherein R, 1 and 2 represent the register 8 and output registers 13 and 14, respectively A column g represents addresses of the ROM 3 and RAM 4 when the column b represents the load instruction and represents addresses of multiplication coefficients when the column b represents the multiplication instruction. A column h represents selected memories (ROM, RAM).

The calculation of the values of the sawtooth signal is performed on the basis of this program list as follows.

Firstly, on the basis of the program at an address 79 of the I-ROM (I-RAM) 2, a value is loaded to the register 8 from an area of an address 0D of the RAM 4 in which the value X is previously stored.

Then, on the basis of the program at an address 7a, a value is loaded to the register 8 from an area of an address 14 of the RAM 4 at which a coefficient of the linearity D is previously stored, and also the sum of 0 and the value of the register 8 is obtained by the adder 10. A result of the sum is supplied to the accumulator 11.

In accordance with the program at an address 7b, the multiplication of the lower 8 bits of the accumulator 11 and the content of an address 12 of the RAM 4 is performed by the multiplier 7 and also the sum of 0 and the value of the register 8 is performed in parallel. A resultant sum is supplied to the accumulator 12. The accumulator 11 holds the previous result of the sum. Now, the RAM 4 stores a coefficient C of the S correction at the address 12. Thus, the program at the address 7b performs a sum of product CX (lower bits) and (0+D) to obtain CX (lower bits)+D.

Then, on the basis of the program at an address 7c, the multiplication of the upper 8 bits of the accumulator 11 and the content of the address 12 of the RAM 4 is performed by the multiplier 7. Further, in parallel with this multiplication, the value D of the accumulator 12 is added with a value which is obtained by shifting (e.g., selecting by the selector 9) the value (CX (lower bits)+D) obtained by the processing of the program at the address 7b to the lower bit side by 8 bits. Thus, the program at the address 7c performs a sum of products CX (upper bits) and CX (lower bits)+D.

In accordance with the program at an address 7d, for preparing the next calculation, a value of the address 16 of the ROM 3 is loaded into the register 8, and also the sum of a value (CX (lower bits)+D) of the accumulator 12 and a value (CX (upper bits)+D) of the multiplier 7 obtained by the processing at the address 7c is performed in parallel with the multiplication. Thus, the program at the address 7d performs a sum of product CX (upper bits)+CX (lower bits)+D to obtain a value CX+D which in turn is supplied to the accumulator 11.

Then, the above-described processings are sequentially repeated to obtain a value ((CX+D)X+1) by processing the program at an address 80, (((CX+D)X+1)X) by processing the program at an address 84, and (((CX+D)X+1)X+0)B+A=$Y_{SAW}$ by processing the program at an address 89, and these values are sequentially supplied to the accumulator 11. Lastly, the value $Y_{SAW}$ is supplied to the output register 13 in accordance with the program at an address 8a.

The following table 2 shows an example of program lists for performing the calculation of the parabolic wave signal $[Y_{PARA}=(GX^4+X^2+HX)FB^2+E]$ by the circuit arrangement of FIG. 1.

TABLE 2

| a | b | c | d | e | f | g | h |
|---|---|---|---|---|---|---|---|
| 5e | L | K > Y | Z + L = . | — | R | 0D | M |
| 5f | M | — > — | Z + R = . | A | — | 00 | O |

TABLE 2-continued

| a | b | c | d | e | f | g | h |
|---|---|---|---|---|---|---|---|
| 60 | M | —>— | Z + R = H | B | — | 18 | M |
| 61 | M | —>— | Z + B = . | A | — | 18 | M |
| 62 | L | K > Y | A + L = . | — | R | 02 | O |
| 63 | M | —>— | Z + R = H | A | — | 0D | L |
| 64 | M | —>— | A + B = H | B | — | 0D | M |
| 65 | M | —>— | A + B = . | A | — | 0D | M |
| 66 | L | K > Y | A + L = . | — | R | 17 | M |
| 67 | M | —>— | Z + R = H | A | — | 0D | L |
| 68 | M | —>— | A + B = H | B | — | 0D | M |
| 69 | M | —>— | A + B = . | A | — | 0D | M |
| 6a | L | K > Y | A + L = . | — | R | 00 | O |
| 6b | M | —>— | Z + R = H | A | — | 0D | L |
| 6c | M | —>— | Z + C = H | B | — | 0D | M |
| 6d | M | —>— | A + C = . | A | — | 0D | M |
| 6e | L | K > Y | A + M = . | — | R | 00 | O |
| 6f | M | —>— | Z + R = H | B | — | 04 | M |
| 70 | M | —>— | Z + B = . | A | — | 04 | M |
| 71 | L | K > Y | A + L = . | — | R | 00 | O |
| 72 | M | —>— | Z + R = H | B | — | 0F | M |
| 73 | M | —>— | Z + B = . | A | — | 0F | M |
| 74 | L | K > Y | A + L = . | — | R | 16 | M |
| 75 | M | —>— | Z + R = H | B | — | 0F | M |
| 76 | M | —>— | A + B = . | A | — | 0F | M |
| 77 | L | K > Y | A + L = . | — | R | 00 | O |
| 78 | L | X > Y | Z + L = . | A | 2 | 00 | M |

The calculation of the parabolic wave signal is performed by using this table 2 in the same manner as the case of the sawtooth wave signal.

Namely, a value GX+0 is obtained by processing the program at an address 61 of the I-ROM (I-RAM) 2, (GX)X+1 is obtained by the program at an address 65, ((GX)X+1)X+H is obtained by the program at an address 69, ((GX)X+1)X+H)X+0 is obtained by the program at an address 6d, ((GX)X+1)X+H)XF is obtained by the program at an address 70, ((GX)X+1)X+H)XFB is obtained by the program at an address 73, and ((GX)X+1)X+H)XFB$^2$+E=Y$_{PARA}$ is obtained by the program at an address 77. These values are sequentially supplied to the accumulator 11. Then, the value Y$_{PARA}$ is supplied to the output register 14 by processing the program at an address 78.

These processings are performed sequentially at every timing signal, whose frequency (2f$_H$) is, for example, twice that (f$_H$) of the horizontal sync. signal, on the basis of the count value X at the time.

Figure 2:
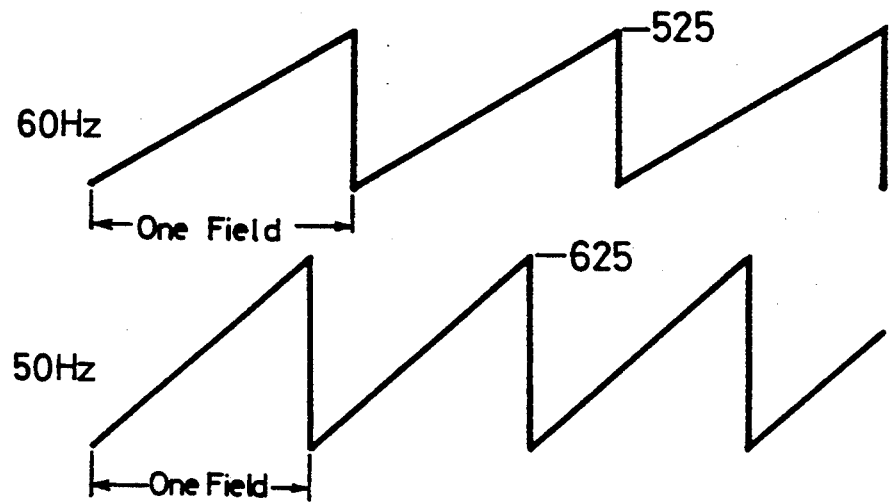
FIG. 2 shows a waveform diagram used to explain the operation of the arrangement of FIG. 1.

In the case of applying the circuit of FIG. 1 to a system such as a monitor receiver with a vertical sync. frequency of 60 Hz or 50 Hz, for example, the count value X counting the timing signal with the frequency (2f$_H$) of twice that (f$_H$) of the horizontal sync. signal changes from 0 to 525 and from 0 to 625 when the vertical sync. frequency is 60 Hz and 50 Hz as shown in (a) and (b) of FIG. 2, respectively. Now, the screen of one field displayed on a cathode ray tube is same in both the cases where the vertical sync. frequencies are 60 Hz and 50 Hz. Further, values of the correction waveforms, for example, the sawtooth waveform and the parabolic waveform correspond to absolute positions on the screen.

Figure 3:
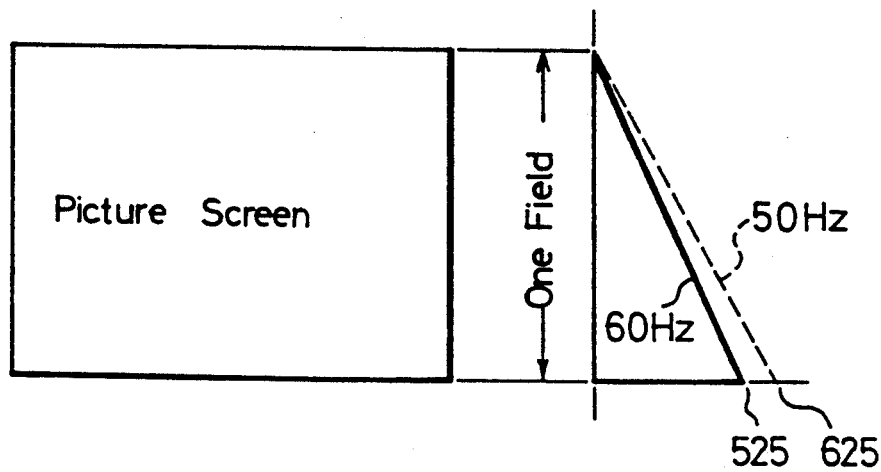
FIG. 3 shows a schematic diagram illustrating a relation between a screen and vertical sync. frequency, and to which references will be made in explaining operation of the arrangement of FIG. 1.

Thus, when the count value X is compared with reference to the screen, the count values X in the cases where the vertical sync. frequencies are 60 Hz and 50 Hz can be related to the screen as shown by steady and phantom lines in FIG. 3, respectively. As clear from FIG. 3, count values X of the respective cases are proportional at the absolute positions of the screen in the vertical scanning direction. Thus, if the count value used in the above-described calculations is set as X*=K1 X, and this count value X* is calculated in advance in a manner that K1 are set to be 1 and 0.84 when the vertical sync. frequencies are 60 Hz and 50 Hz, respectively, an amount of distortion of an image with respect to the absolute positions on the screen becomes constant irrespective of the kinds of the systems. In this case, it becomes unnecessary to change parameters or the like for every different kind of system. Now, the calculation of X*=K1 X may be performed by the multiplier 7.

According to the thus constructed synthesizer of the embodiment, the synthesizer can be multistandardized by merely multiplying the count value X by a predetermined coefficient K1. Thus, it becomes possible to obtain various kinds of desirable correction waves (Y$_{SAW}$, Y$_{PARA}$) depending on the respective systems by the simplified circuit configurations.

In the high definition television (HDTV) receivers, an aspect ratio of the screen is determined to be 16:9. However, since a monitor receiver for displaying the HDTV signal is very expensive, it has been proposed to display the HDTV signal on the conventional ordinary monitor receiver with an aspect ratio 4:3 In this case, it has been proposed to downconvert the frequency of the image signal so that the number of the horizontal scanning lines during one frame becomes, for example, 525 or 625, and also to decrease the width of the vertical deflection as shown in FIG. 4.

Figure 4:
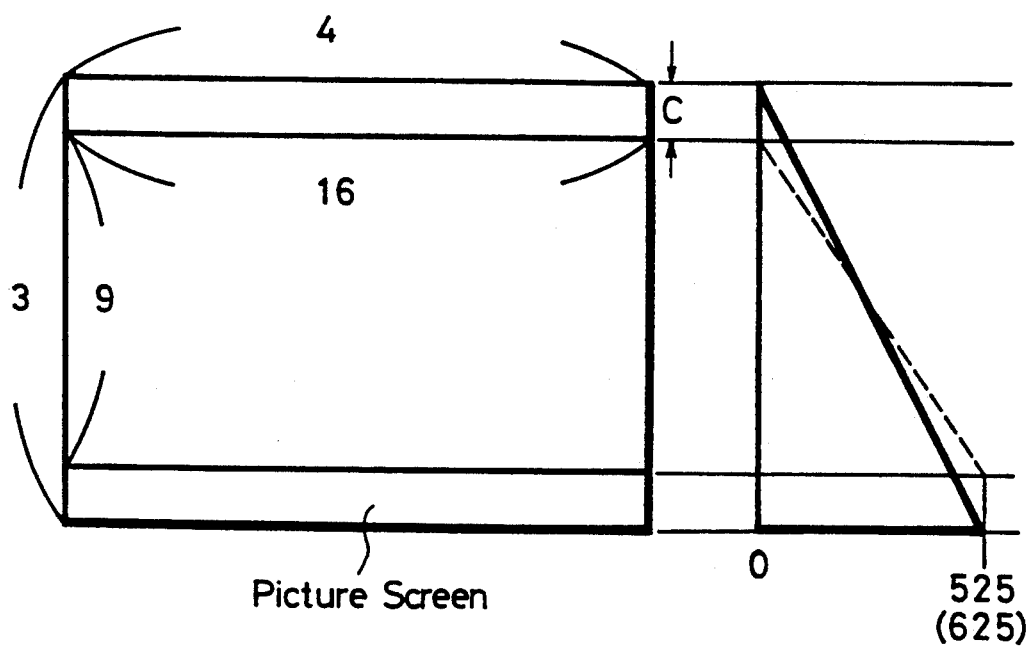
FIG. 4 shows a schematic diagram illustrating a relation between screen sizes and vertical sync. frequency, and to which references wil be made in explaining operation of the arrangement of FIG. 1.

In case of performing the display in this manner, the count value X will change as illustrated by a steady line and a dotted line in FIG. 4 when the aspect ratio of the screen is selected to be 4:3 and 16:9, respectively. That is, as clear from FIG. 4, the count value X of each of the steady and dotted lines is proportional to the absolute positions on the corresponding screen. Thus, if the count value used in the above-described calculations is set as X**=K2 X*, and this count value X** is in advance calculated in a manner that K2 is set to be a predetermined coefficient (e.g., K2=0.75), it becomes possible to obtain various desirable correction waveforms (Y$_{SAW}$, Y$_{PARA}$) even in case of displaying the HDTV signal on the conventional ordinary monitor receiver with an aspect ratio 4:3.

Figure 5:
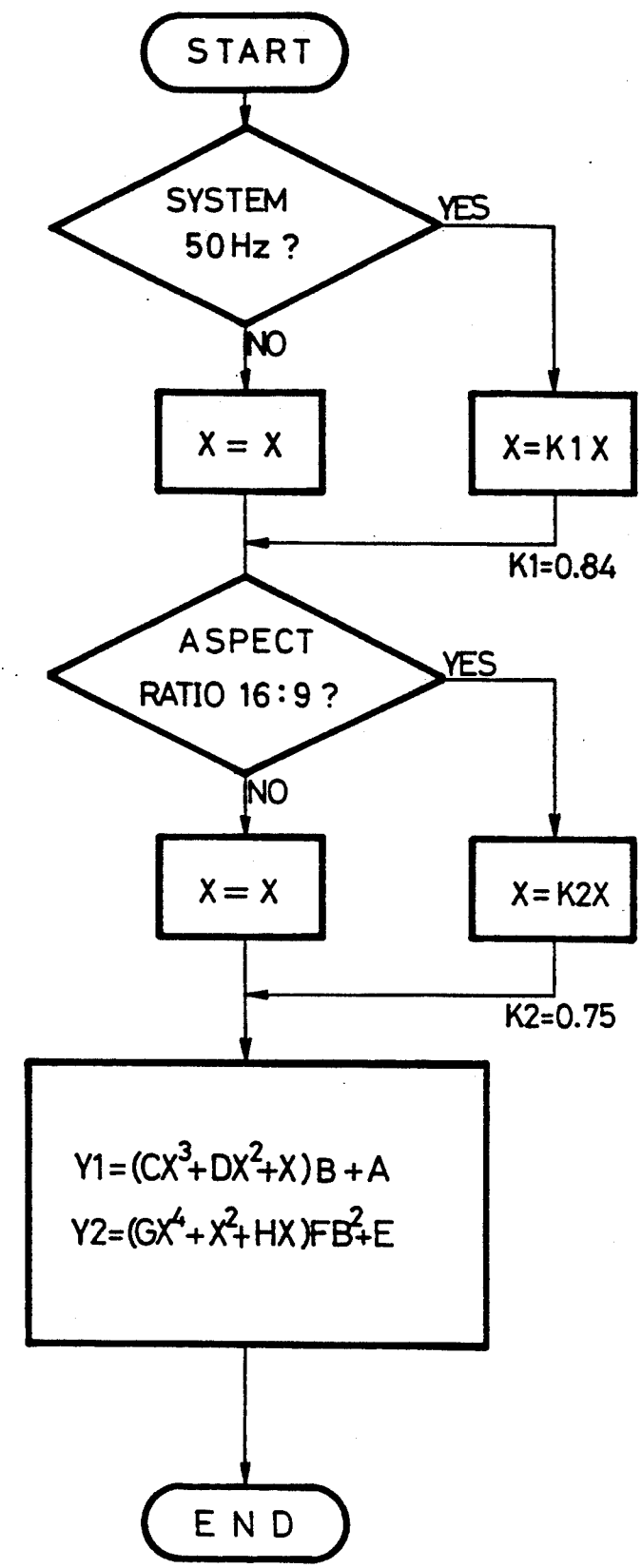
FIG. 5 shows a flowchart to which references will be made in explaining the operation of the arrangement of FIG. 1.

FIG. 5 shows a flowchart used to explain the operations for discriminating the systems etc. to determine the coefficients K1 and K2 and obtaining the count values or the like. Now, the calculation of X**=K2 X* can also be performed by the multiplier 7. Further, in case of displaying the screen with the aspect ratio 16:9 on the center portion in the vertical direction of the screen with the aspect ratio 4:3, a distance C from the top end of the screen may be added to the count value X to obtain the value X=K2 X*+C. This summing operation can be performed by the adder 10.

As set out above, according to this invention, the synthesizer can be multistandardized by merely multiplying the count value by a predetermined coefficient(s). Thus, it becomes possible to obtain various kinds of desirable correction waves depending on the respective systems by the simplified circuit configurations.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A raster distortion correcting signal synthesizer, comprising:
   a bus line;
   a multiplier connected to said bus line;
   an adder connected to an output of said multiplier;
   a memory connected to said bus line for storing data and predetermined coefficients; and
   control means for controlling said multiplier, said adder and said memory in accordance with a count value of a horizontal sync. signal, wherein said control means includes means for calculating a high-order raster distortion correcting signal by utilizing said multiplier and adder on the basis of the count value, and said control means controls said multiplier to multiply to count value by a predetermined coefficient from the memory to obtain a new count value.

2. A raster distortion correcting signal synthesizer according to claim 1, wherein said predetermined coefficient is selected in accordance with a determined vertical sync. frequency.

3. A raster distortion correcting signal synthesizer according to claim 1, wherein said predetermined coefficient is selected in accordance with a determined aspect ratio of a screen to be rastered.

* * * * *